H. KRAUSE.
BOTTLE WASHER.
APPLICATION FILED MAY 2, 1910.
1,022,199.
Patented Apr. 2, 1912.
7 SHEETS—SHEET 1.
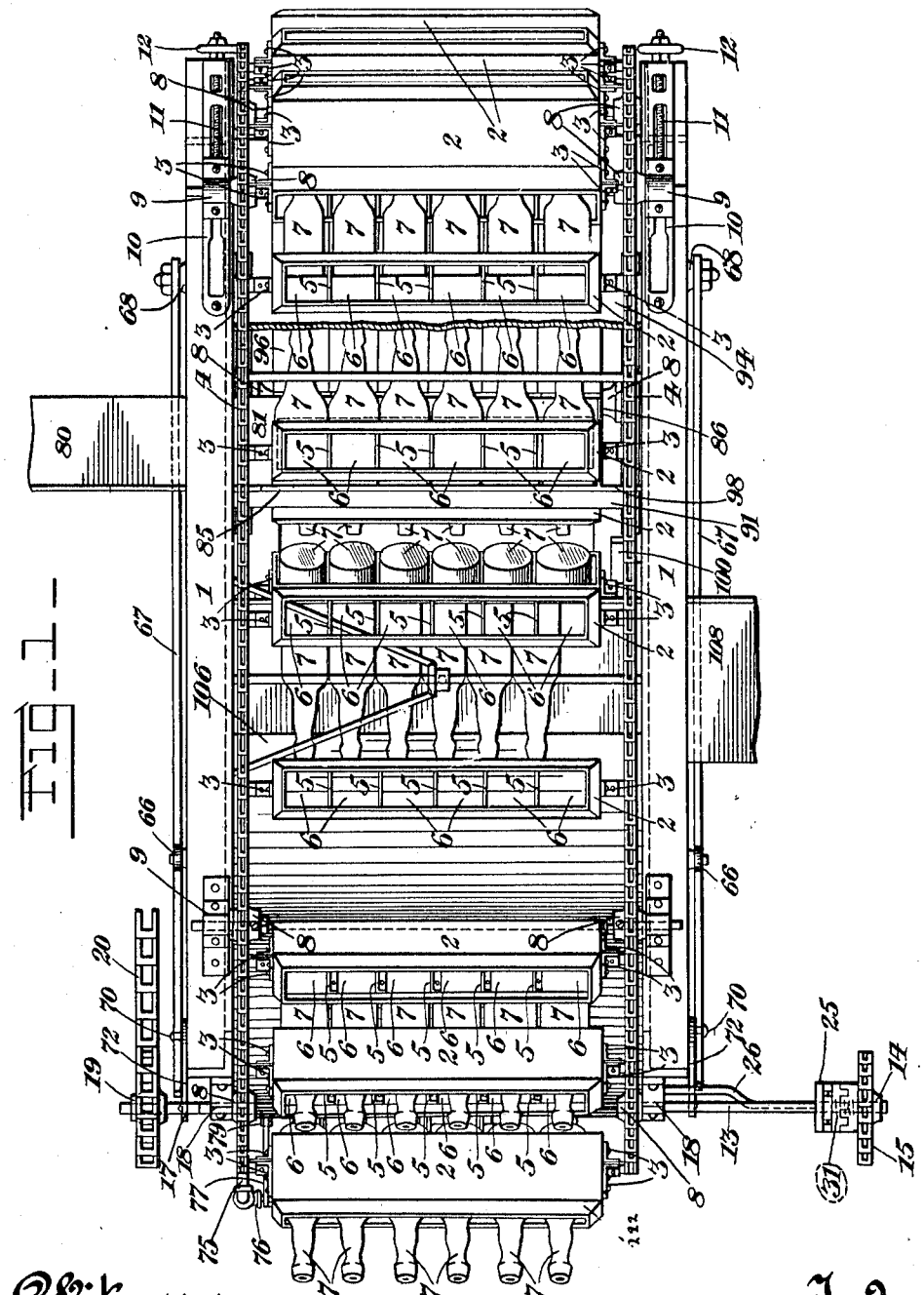
Witnesses:
Chas. A. Becker.
George G. Anderson.
Inventor:
Hermann Krause,
By Hugh K. Wagner,
His Attorney.

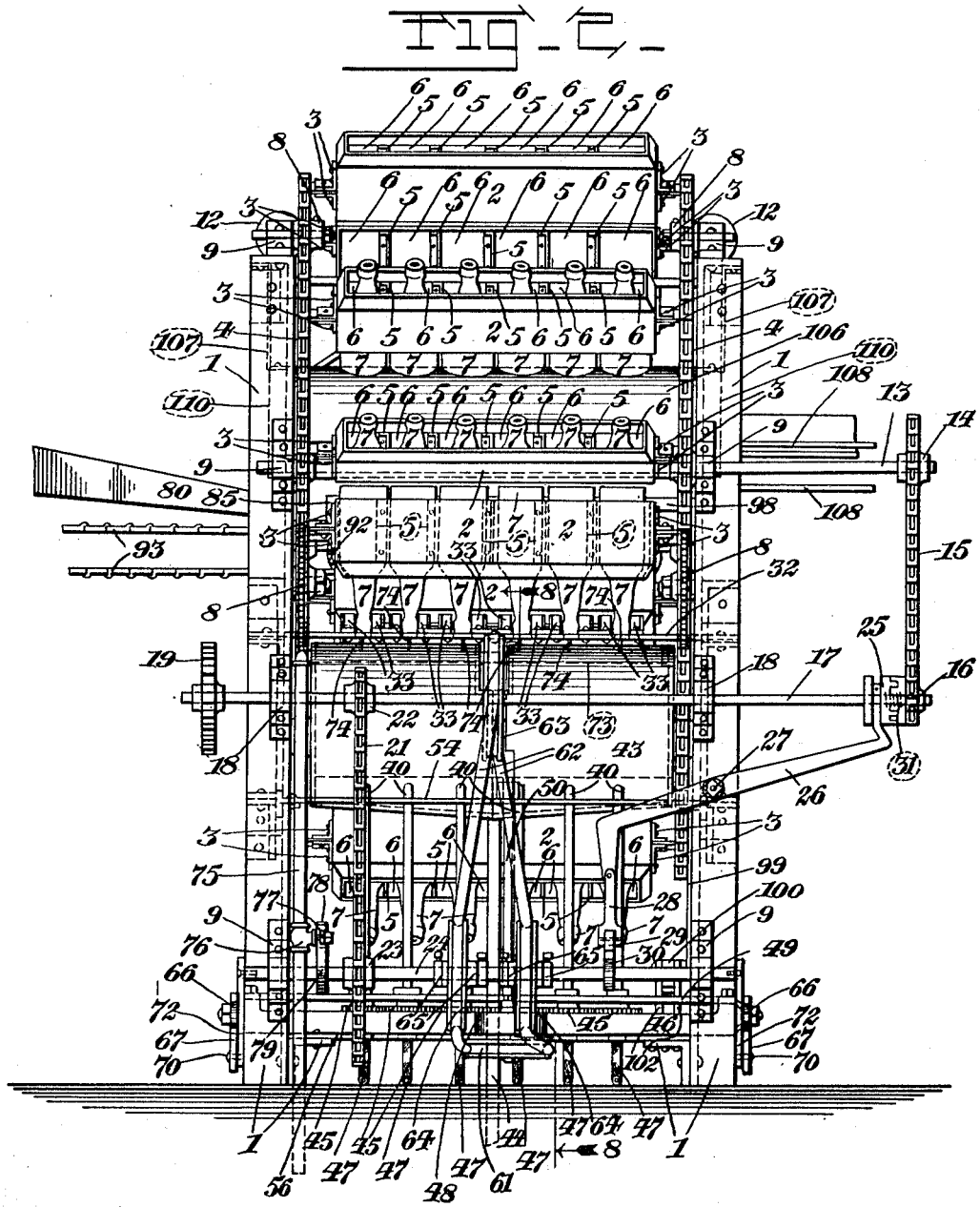

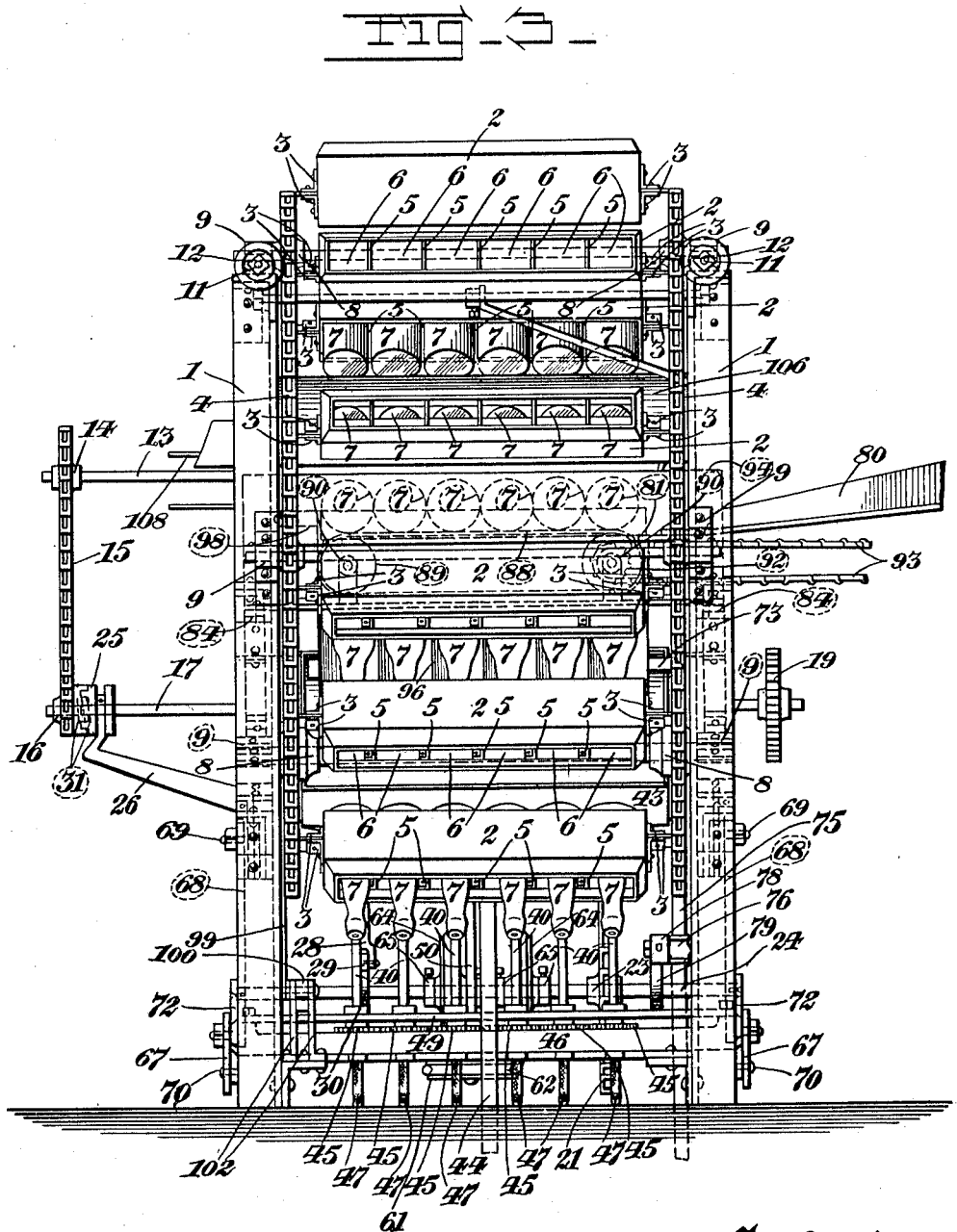

H. KRAUSE.
BOTTLE WASHER.
APPLICATION FILED MAY 2, 1910.
1,022,199.
Patented Apr. 2, 1912.
7 SHEETS—SHEET 4.
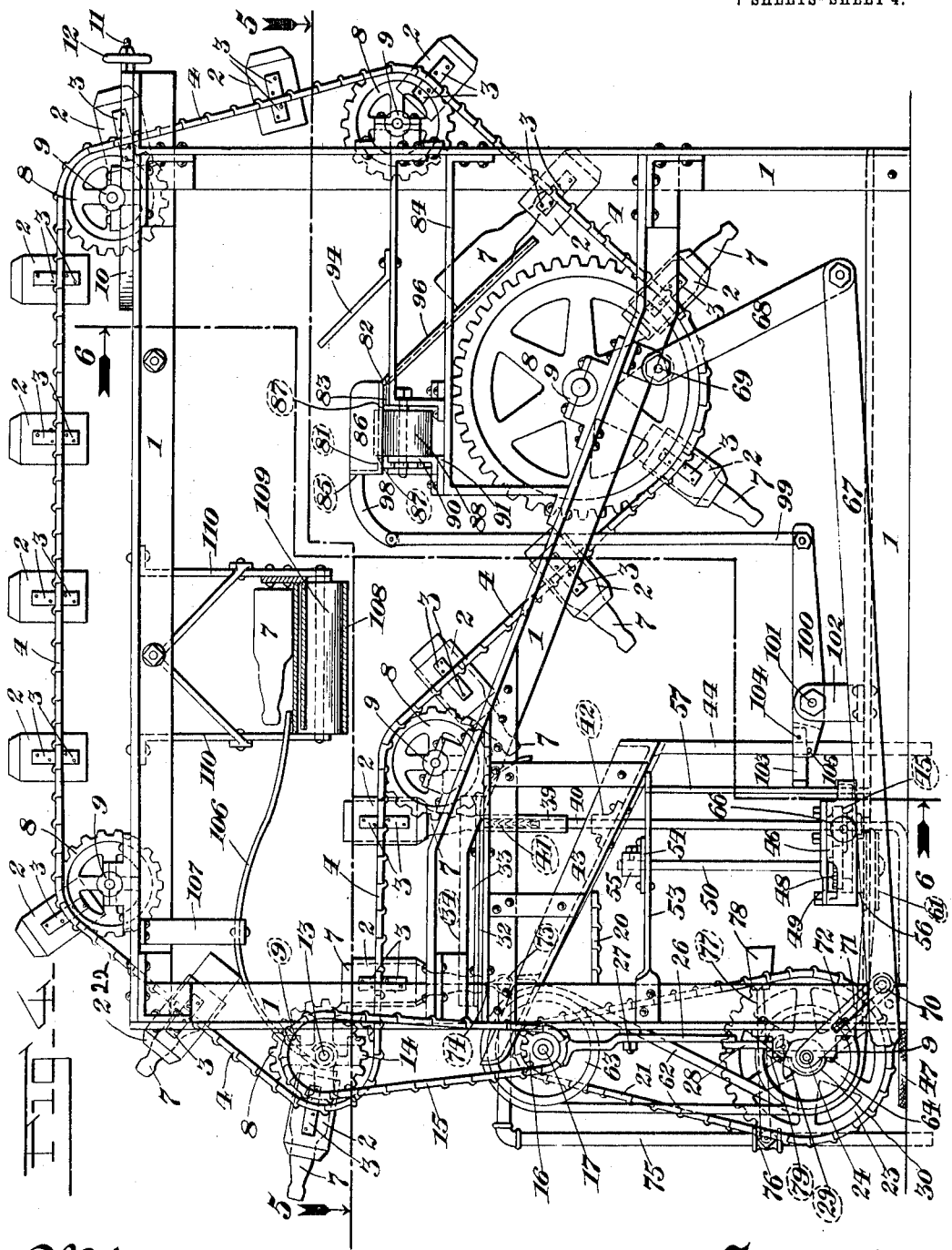

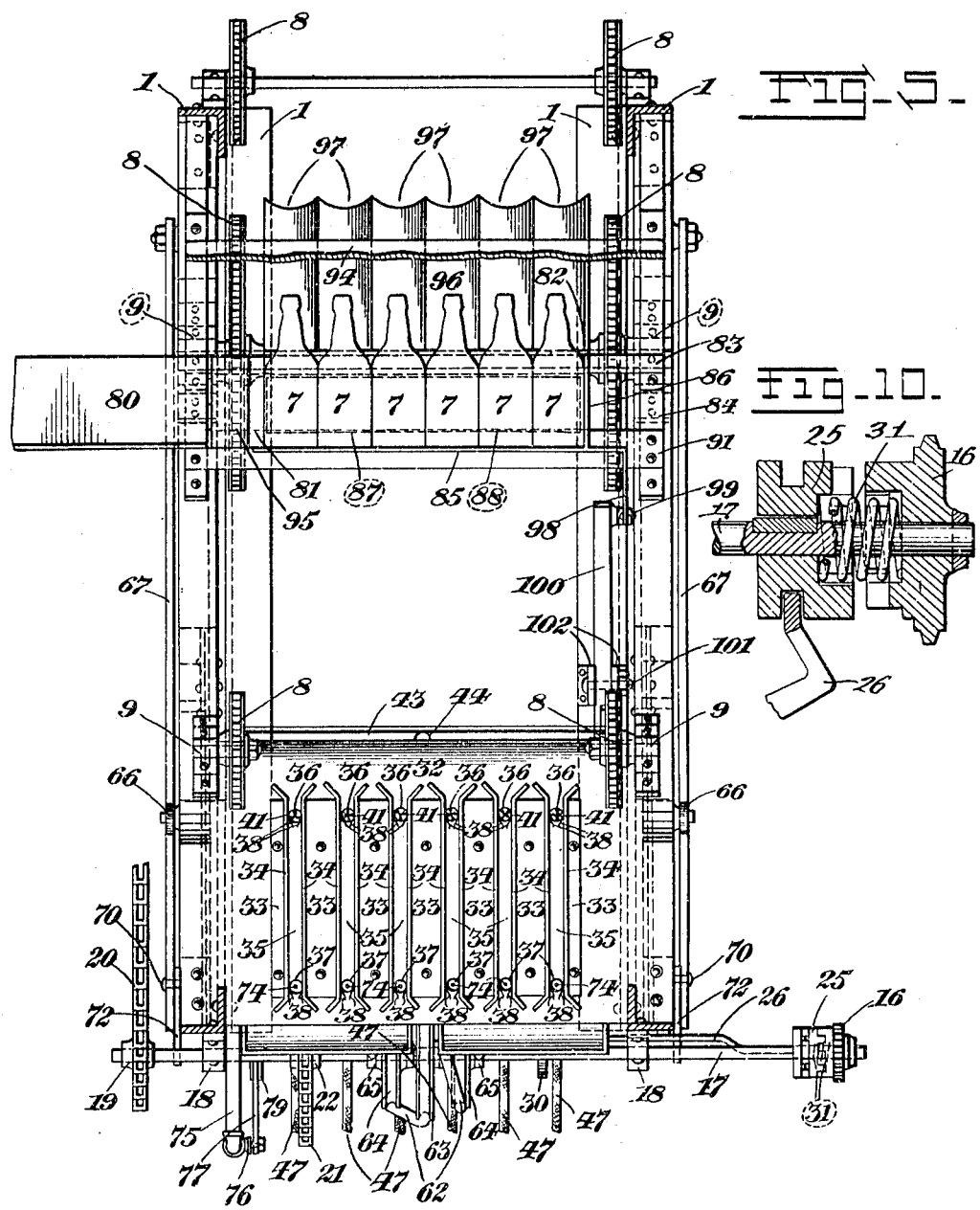

H. KRAUSE.
BOTTLE WASHER.
APPLICATION FILED MAY 2, 1910.
1,022,199.
Patented Apr. 2, 1912.
7 SHEETS—SHEET 6.
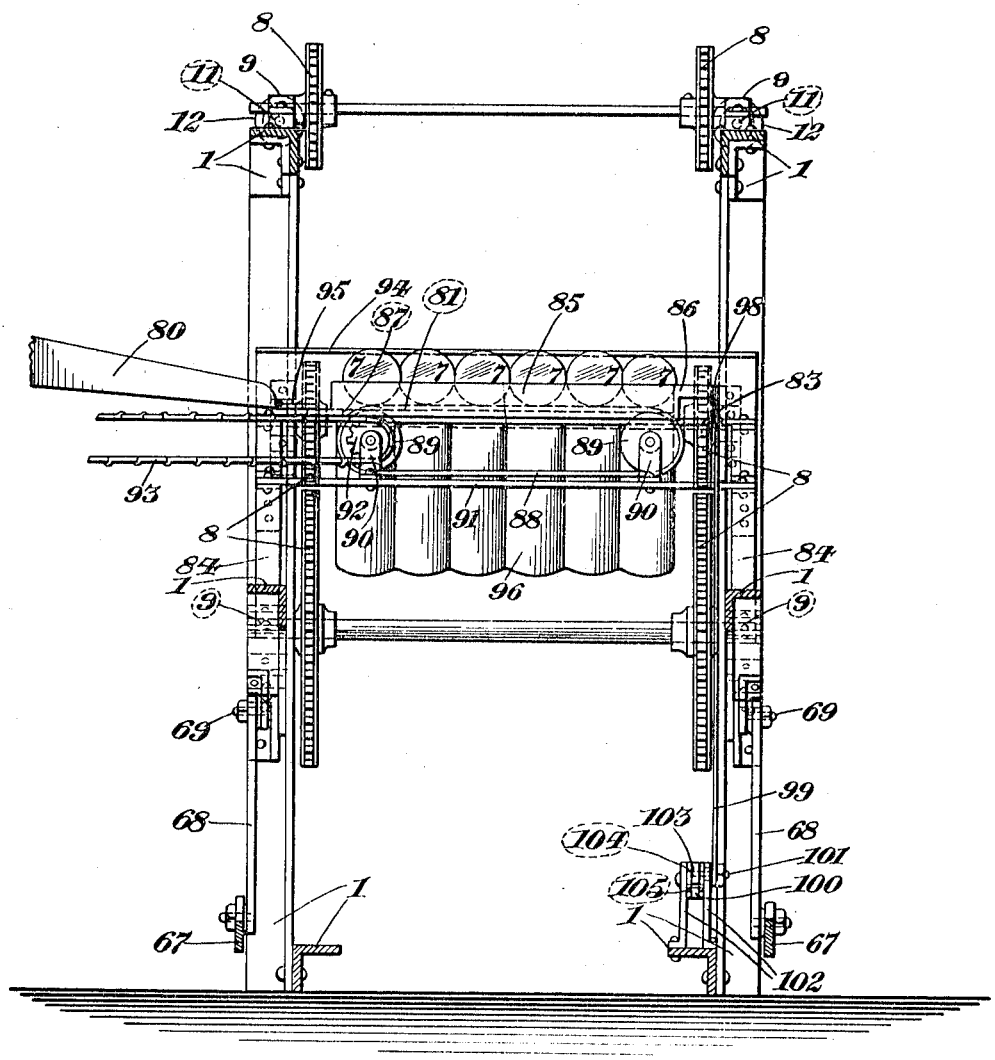

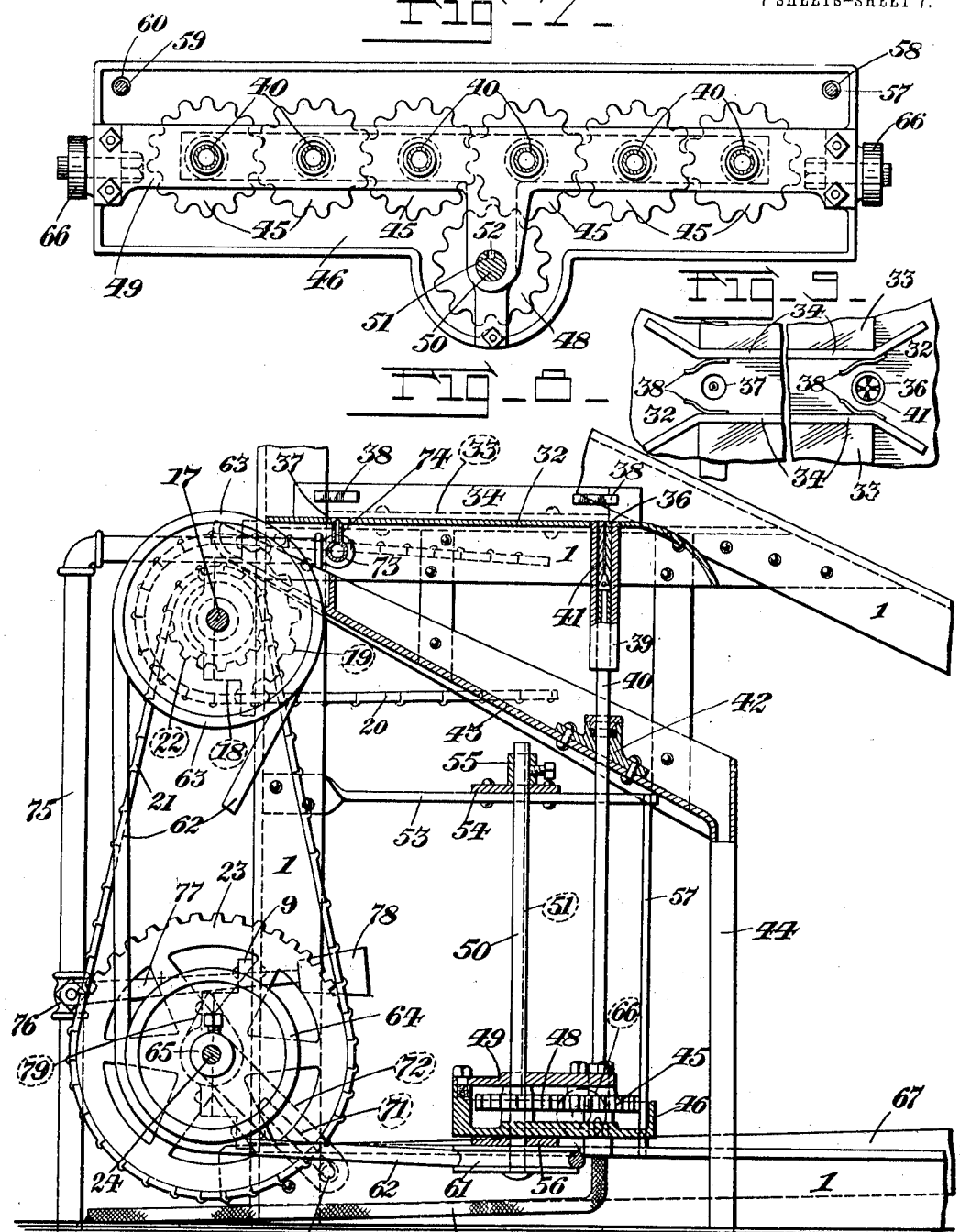

UNITED STATES PATENT OFFICE.

HERMANN KRAUSE, OF ST. LOUIS, MISSOURI, ASSIGNOR TO HENRY SCARBOROUGH, SR., OF CHICAGO, ILLINOIS.

BOTTLE-WASHER.

1,022,199.  Specification of Letters Patent.  Patented Apr. 2, 1912.

Application filed May 2, 1910. Serial No. 559,009.

*To all whom it may concern:*

Be it known that I, HERMANN KRAUSE, a subject of the Emperor of Germany, residing at the city of St. Louis, State of Missouri, have invented certain new and useful Improvements in Bottle-Washers, of which the following is a specification, reference being had therein to the accompanying drawings.

This invention has for its object to provide a bottle-washing machine which is adapted to receive and to discharge the bottles automatically and to wash and rinse the bottles at predetermined places intermediate the receiving and discharging points, and is particularly intended to be used in conjunction with the machine constituting the subject-matter of my co-pending application Serial No. 518,167, filed September 17, 1909.

This invention consists in certain novel combinations of parts and certain details of construction as hereinafter fully described and pointed out in the claims.

In the drawings forming part of this specification, in which like numbers of reference denote like parts wherever they occur, Figure 1 is a top plan view; Figs. 2 and 3 are end elevations; Fig. 4 is a side elevation; Fig. 5 is a sectional view on the line 5—5, Fig. 4; Fig. 6 is a sectional view on the line 6—6, Fig. 4; Fig. 7 is a top plan view of the pan containing the brush-operating mechanism; Fig. 8 is a sectional view on the line 8—8, Fig. 2; and Fig. 9 is a top plan view of one of the bottle guides. Fig. 10 is an enlarged detail sectional view illustrating the clutch device and the spring associated therewith.

The parts of the machine are supported by a suitable frame 1. A plurality of bottle receptacles 2, each of which is connected by angle-irons 3 or other suitable means to a pair of parallel endless chains 4, are spaced at equal distances apart along the length of said chains. Each of said bottle receptacles is divided by a plurality of division plates 5 into a plurality of pockets 6. The bottom edges 222 of each bottle receptacle are bent inwardly so that, when said receptacle occupies a position to receive a plurality of bottles 7, each pocket 6 will receive one of said bottles and will hold same in an inverted position.

Each chain 4 is arranged to operate in engagement with a plurality of sprocket wheels 8. The sprockets 8 of one chain are located preferably opposite the sprockets 8 of the other chain and each of said sprockets is journaled in a suitable journal box 9 on frame 1. Each chain 4 is provided with a chain-tightening device to regulate the tension thereof. Each chain-tightening device comprising a slide 10 upon which a journal box 9 is mounted. A screw-threaded rod 11, which is attached to said journal box 9, extends through an opening in an end of said slide and receives handwheel 12, and, when said wheel is turned in one direction the tension of chain 4 is increased, but, when said wheel is turned in the opposite direction, the tension of chain 4 is decreased. One pair of said oppositely-located sprockets 8 is mounted on a shaft 13 and, when said shaft is rotated in the manner hereinafter described, motion is imparted to both chains 4, thereby causing said chains to move the bottle receptacles.

A sprocket wheel 14 mounted on shaft 13 is driven by a chain 15 which is driven intermittently by a sprocket 16 loosely mounted on the operating shaft 17 journaled in journal boxes 18 on frame 1. Sprocket 19 on said operating shaft 17 receives its power from a chain 20 which is driven from any desirable source, or which can be driven from the drive shaft of the machine disclosed in my above-mentioned application when said machine is used in conjunction with the machine of this application.

A chain 21, which is driven by sprocket 22 on shaft 17, drives sprocket 23 and with it shaft 24 upon which said sprocket 23 is mounted. Clutch 25 is splined to shaft 17 and is arranged to slide longitudinally thereon. Lever 26 is fulcrumed at 27 to frame 1 and is provided with a forked end which is adapted to actuate said clutch. A member 28 bearing a roller 29 is fastened to the other end of said lever, said roller being arranged to ride upon a cam 30 on shaft 24. A spring 31 holds clutch 25 normally out of engagement with sprocket 16 when roller 29 rides on the low side of cam 30, thereby allowing said sprocket to remain at rest on shaft 17, but when roller 29 rides on the high side of cam 30, the forked end of lever 26 causes clutch 25 to engage sprocket 16, thereby causing said sprocket to rotate with shaft 17 and to impart motion through chain 15 to the bottle receptacles 2.

After a plurality of bottles 7 are delivered to a bottle receptacle 2 in the manner hereinafter described said receptacle is moved to a position over table 32. Said receptacle holds the bottles in an inverted position over table 32 and occupies such position relative to said table that when said receptacle passes over table 32, the mouth of each bottle therein moves along the top surface of said table. A plurality of guides 33 preferably formed of metal plates, are arranged parallel to each other on table 32 and are secured by rivets or other suitable means to said table. The adjacent longitudinal edges of each two adjacent guides are bent to form sides 34 of a passage 35 therebetween. Each passage 35 is arranged to aline with the path of travel of a bottle 7, whereby the mouth of said bottle is caused to pass through said passage. The sides 34 of each passage 35 are bent outwardly adjacent the receiving end thereof to guide the mouth of the bottle into said passage and are similarly bent adjacent the delivery end of said passage to allow the mouth of said bottle to pass readily out of said passage.

Table 32 is provided with a plurality of brush openings 36, each of which openings is located at the receiving end of a passage 35 and, also, with a plurality of rinsing water openings 37 each of which openings 37 is located at the delivery end of a passage 35. The brush openings 36 are located at such distance from the rinsing water openings 37 and the stopping of the receptacles 2 is so regulated that, during the time the receptacles 2 are at rest, the bottles in one of said receptacles occupy a position over openings 37 and the bottles in the next following receptacle occupy a position over openings 36. To center the mouth of a bottle over either a brush opening 36 or a rinsing water opening 37, each side 34 adjacent thereto is provided with a spring 38 or other suitable means.

Each brush opening 36 is provided with a pipe 39 which is arranged to project downwardly from the under side of table 32 and is secured thereto in any ordinary manner. Each pipe 39 contains a tube 40 to which a brush 41 is attached and which is adapted to reciprocate in said pipe. Said tube extends through a stuffing-box 42 fastened to a drip pan 43 which is located beneath said table. Said pan is supported by frame 1 and is arranged to catch the water which runs off table 32, a pipe or hose 44 being attached to said pan in order to carry the waste water away. Each tube 40 is provided with a gear wheel 45 which is secured thereto and which is mounted in a pan 46 and is arranged to extend through the bottom of said pan. The lower end of said tube is suitably attached to a flexible pipe 47 which is connected to the water supply (not shown in the drawings) and the upper end of said tube is provided with an opening to discharge the fluid into a bottle when said brush 41 is inserted into a bottle. Each gear 45 meshes with the one adjacent thereto so that, when one gear 45 is rotated, all are caused to rotate simultaneously. A pinion 48, which meshes with one of said gears 45, is mounted in pan 46. A member 49 is fastened to pan 46 and is arranged to hold the gears 45 and pinion 48 in place in said pan. A shaft 50 upon which pinion 48 is slidably mounted is provided with a keyway 51 which extends longitudinally thereof. A key 52 borne by said pinion projects into said key-way, whereby pinion 48 is caused to rotate with said shaft. Members 53, secured to frame 1, support a cross-piece 54 through which the upper end of shaft 50 extends. A collar 55 or other suitable device, which is fastened to said shaft, rests upon said member and supports said shaft in a vertical position. The lower end of shaft 50 extends through a cross-piece 56 which is supported by frame 1. One member 53 supports a rod 57 which extends through an aperture 58 in pan 46 and the other member 53 supports a rod 59 which extends through an aperture 60 in said pan 46, and, when said pan is raised and lowered in the manner hereinafter described, said pan is guided by rod 57 and rod 59. A pulley 61 is fastened preferably to the lower end of shaft 50 and is driven by a belt 62, which is driven by a pulley 63 on shaft 17. Due to the fact that shaft 17 extends approximately at a right angle to shaft 50, it is necessary to provide a pair of idle pulleys 64, or the like, which are loosely mounted on shaft 24 and which are held in place by collars 65 on said shaft 24, whereby belt 62 is guided between pulley 61 and pulley 63. Each end of pan 46 bears a roller 66 which is arranged to rest upon a member 67. One end of member 67 is attached to member 68, said member 68 being pivoted at 69 to frame 1. The other end of said member 67 is fastened at 70 in a slot 71 of an arm 72 which is secured to shaft 24. When shaft 24 is rotated arm 72 rotates therewith and alternately raises and lowers member 67, thereby causing said member to raise and to lower pan 46. When said member 67 raises pan 46 to its highest position, each brush 41 is caused to extend through a brush opening 36 and to project into a bottle 7 above said opening, but when said member 67 lowers pan 46 to its lowest position, said brush 41 is withdrawn from bottle 7 and is lowered into a pipe 39 so that the top of said brush occupies a position below the top of table 32 in order to allow said bottle to be moved across the top of said table. In this connection, it may be stated that water only flows out through the openings 36 when the brushes are in their raised position; that is to say, when said brushes are projected through said openings into the bottles, since the brushes, on being lowered into the pipes 39, will pack the latter and effectually preclude the passage of the water therethrough. See Fig. 8.

A pipe 73, which is located beneath table 32, is arranged to aline with the openings 37 for the rinsing water in said table and is provided with a plurality of nozzles 74 or the like. Each nozzle is located beneath an opening 37 so that water ejected therefrom is caused to squirt through said opening. Said pipe 73 is connected to a water-supply pipe 75 in which a valve 76 is located. Said valve is operated automatically by a lever 77 which is caused by a weight 78, to ride upon a cam 79 on shaft 24. The opening and closing of valve 76 is regulated by cam 79 so that during the time the bottles 7 in a receptacle 2 are at rest over openings 37 the water is allowed to squirt from each nozzle 74 into the bottle 7 thereabove but when the receptacles 2 are in motion the water supply is cut off.

An inclined chute 80 is arranged to deliver the bottles 7 to a plate 81, which is hinged along edge 82 to a cross-piece 83 supported by members 84 fastened to frame 1. A longitudinal edge 85 is bent upwardly to form a guide for the bottoms of the bottles 7, and an end edge 86 is turned upwardly to form a stop for said bottles. An opening 87 is formed in said plate and extends longitudinally thereof. A belt 88, which runs on pulleys 89 is arranged to extend through opening 87 so that when a bottle 7 is delivered from chute 80 to plate 81 said bottle is caused by belt 88 to travel toward stop 86. Each pulley 89 is supported by a bracket 90 on cross-piece 91. A sprocket 92, which is arranged to drive one of said pulleys 89 is driven by a chain 93, which is driven from any desirable source. A plate 94 is supported by members 84 and is arranged to form a guide for the mouth of each bottle, when the bottles are moved by belt 88. Said plate is of such length and is arranged so that it can receive and hold the same number of bottles 7 as the number of pockets 6 in a receptacle 2. A plate 95, which is hinged to the end of chute 80, extends over the end of plate 81, so that, when plate 81 holds its full capacity of bottles, a bottle 7 rests upon plate 95 adjacent the last bottle on plate 81, and, when plate 81 is raised to dump the bottles therefrom in the manner hereinafter described, plate 81 raises the free end of plate 95, thereby causing said plate 95 to prevent the bottle thereon from being delivered to plate 81 until said plate 81 is returned to its normal position.

A chute 96 which is fastened along one edge to cross-piece 83 is arranged to slope downwardly therefrom and is provided with a plurality of corrugations 97, each of said corrugations being arranged to receive a bottle 7 from plate 81. Said chute 96 occupies such position relative to the receptacles 2 that when said receptacles are at rest, one of said receptacles 2 occupies a position to receive the bottles 7 which slide down said chute, said corrugations being arranged to guide said bottles into the pockets 6 in said receptacle.

An arm 98 projecting from plate 81 is fastened to one end of a rod 99. The other end of rod 99 is attached to an end of a lever 100 which is fulcrumed at 101 to a support 102 fastened to frame 1. A member 103 is pivoted at 104 to the other end of the lever 100 and is arranged to rest normally on a pin 105 secured to said lever. Said member 103 projects into the path of movement of an edge of pan 46 and when said pan is caused to travel upwardly in the manner hereinabove described an edge of said pan raises the end of member 103, thereby causing said member to rotate on pivot 104 until said pan passes above said member and allows same to return and rest upon pin 105, but, when said pan 46 is lowered, an edge thereof presses downwardly on the end of member 103, thereby causing said member to press downwardly on pin 105, thus causing said member to force one end of lever 100 downwardly and the rod 99 at the other end of said lever upwardly. When rod 99 is raised in the manner just described the arm 98 is forced upwardly whereby the plate 81 is caused to swing upwardly on its hinged edge 82, thus causing the bottle on said plate to slide down the chute 96 into a receptacle 2.

A slide 106 is arranged to receive the bottles after same are thoroughly cleansed and is supported by a member 107 fastened to frame 1 or by any other suitable means. Said slide extends from shaft 17 to a belt conveyer 108 or the like, which is driven from any suitable source of power and which is arranged to receive the cleansed bottles 7 from said slide and to convey same to some desirable point away from the machine. One of the pulleys 109 of said conveyer may be supported by hangers 110 secured to frame 1 or by any other suitable means. After the bottles in a receptacle 2 have been thoroughly cleansed over table 32, said receptacle is moved to such position over slide 106 that the bottles slide out of said receptacle and down the slide 106 to the conveyer 108.

The operation of the machine is as follows: Power is applied from any suitable source to shaft 17 thereby setting the parts of the machine into operation. The rotation of shaft 17 causes chain 21 to drive shaft 24 and belt 62 to drive shaft 50. When shaft 24 is rotated and the high side of cam 30 raises roller 29, lever 26 causes clutch 25 to engage sprocket 16 thereby causing said sprocket to rotate and to drive chain 15 which causes the shaft 13 to rotate and to move the bottle receptacles 2. Said receptacles continue to move until roller 29 rides upon the low side of cam 30, whereby spring 31 forces clutch 25 out of engagement with sprocket 16, thereby allowing said sprocket to remain at rest upon shaft 17 and thus stopping the movement of said receptacles until roller 29 again rides on the high side of cam 30 to move clutch 25 into engagement with sprocket 16. The bottles 7 are placed either by hand upon chute 80, or are delivered by a conveyer or the like to said chute, or said chute can be arranged to receive the bottles as they are delivered from the machine constituting the subject-matter of my above-mentioned former application when said machine is used in conjunction with the machine disclosed in this application. As the bottles roll upon plate 81 from the chute 80, the belt 88, being set into operation, moves the bottles toward stop 86' until said plate 81 is loaded to its capacity with bottles, the first bottle being held by the stop 86. As shaft 24 rotates, arms 72 rotate therewith and alternately raise and lower members 67, whereby pan 46 is raised and lowered. The movement of pan 46 is regulated so that same descends and engages member 103 after each operation of loading plate 81 with a plurality of bottles 7. As the pan 46 descends and engages member 103 and causes the lever 100 to rotate on fulcrum 101, said lever raises rod 99 which causes plate 81 to swing upwardly on its hinged edge 82, thereby causing the bottles on said plate to slide down chute 96 and into a receptacle 2. After said receptacle receives a supply of bottles, all of the receptacles are moved in a clockwise direction until the receptacle following the loaded receptacle occupies a position to receive a supply of bottles to be cleansed. In this manner each raising of plate 81 causes the bottles thereon to slide down chute 96 and into an empty receptacle 2 below said chute.

During each period of rest of the bottle receptacles 2, one of the loaded receptacles occupies a position over table 32 so that each bottle mouth registers with a brush opening 36. While said bottles are at rest over openings 36 the pan 46 is raised to its highest position, whereby each brush 40 is caused to enter a bottle 7. Shaft 50, being rotated in the manner hereinabove described, drives pinion 48 which drives the gear wheels 45, thereby causing each tube 40 and its brush 41 to rotate continuously. As a brush 41 rotates within a bottle 7 and water flows from an aperture in the end of tube 40, the interior of the bottle is thoroughly cleansed. As pan 46 is lowered, the brushes 41 are withdrawn from the bottles to allow said bottles to be moved. The loaded receptacle is then moved to its next stopping point over table 32 so that each bottle mouth registers with a rinsing water opening 37. During the time the bottles are at rest over openings 37, the cam 79 holds lever 77 in a position to open valve 76, thereby allowing the water to squirt from each nozzle 74 into a bottle 7 thereabove, thus thoroughly rinsing the interior of the bottle, but when the bottle receptacles are in motion said cam holds lever 77 in a position to cut off the water supply.

The receptacle containing the cleansed bottles is then moved to a position over slide 106 and is held in a position to allow the bottle to slide therefrom. The cleansed bottles after leaving the receptacles slide down the slide 106 to the conveyer 108 which carries them away.

I claim:

1. In a bottle washing machine, the combination of an endless carrier having a plurality of bottle receptacles adapted to convey the bottles to be cleansed, means for driving the carrier, devices for cleaning the bottles in a receptacle, a support whereon said cleaning devices are mounted, means for moving said support bodily, and with it said cleaning devices, means for loading said receptacles with bottles, a lever connected at one end with said loading means, and a member connected to the other end of said lever and projecting into the path of movement of said support, for rocking said lever during the movement of said support in one direction, to operate said loading means.

2. In a bottle washing machine, the combination of a support having a plurality of brush openings adjacent one end thereof and a plurality of rinsing water openings adjacent the other end, a bottle carrier having a plurality of bottle receptacles adapted to convey the bottles in an inverted position over said support, means to drive said carrier intermittently to cause one receptacle to stop over said brush openings and another receptacle to stop over said rinsing water openings during each pause of the carrier, a bottle cleansing means comprising a plurality of members each provided with a brush adapted to reciprocate through a brush opening in said support, and to enter and leave a bottle in the receptacle thereabove during each pause of said carrier, a bottle rinsing means comprising a plurality of nozzles connected with a water supply, each of said nozzles being arranged to squirt the rinsing water through a rinsing water opening in said support and into a bottle in the receptacle thereabove, means for supplying said nozzles with the rinsing water under pressure during each pause of said carrier, and a plurality of guides for directing the bottles during their passage over said support.

3. In a bottle washing machine, the combination of a support having a plurality of brush openings adjacent one end thereof and a plurality of rinsing water openings adjacent the other end, a bottle carrier having a plurality of bottle receptacles adapted to convey the bottles in an inverted position over said support, means to drive said carrier intermittently to cause one receptacle to stop over said brush openings and another receptacle to stop over said rinsing water openings during each pause of the carrier, a bottle cleansing means comprising a plurality of members each provided with a brush adapted to reciprocate through a brush opening in said support, and to enter and leave a bottle in the receptacle thereabove during each pause of said carrier, a bottle rinsing means comprising a plurality of nozzles connected with a water supply, each of said nozzles being arranged to squirt the rinsing water through a rinsing water opening in said support and into a bottle in the receptacle thereabove, means for supplying said nozzles with the rinsing water under pressure during each pause of said carrier, a plurality of guides for directing the bottles during their passage over said support, and springs arranged to center the bottles over said brush openings, and said rinsing water openings.

4. In a bottle washing machine, the combination of a support having a plurality of brush openings adjacent one end thereof and a plurality of rinsing water openings adjacent the other end, a bottle cleansing means comprising a plurality of members each provided with a brush adapted to reciprocate through a brush opening in said support, a bottle rinsing means comprising a plurality of nozzles connected with a water supply, each of said nozzles being arranged to squirt the rinsing water through a rinsing water opening in said support, means for conveying the bottles over said support to be treated by said cleansing means and said rinsing means, and a plurality of guides for guiding said bottles during their passage over said support.

5. In a bottle washing machine, the combination of a support having a plurality of brush openings adjacent one end thereof and a plurality of rinsing water openings adjacent the other end, a bottle cleansing means comprising a plurality of members each provided with a brush adapted to reciprocate through a brush opening in said support, a bottle rinsing means comprising a plurality of nozzles being arranged to squirt the rinsing water through a rinsing water opening in said support, means for conveying the bottles over said support to be treated by said cleansing means and said rinsing means, a plurality of guides for guiding said bottles during their passage over said support, and springs arranged to center the bottles over said brush openings, and said rinsing water openings.

6. In a bottle-washing machine, the combination of an operating shaft, an auxiliary shaft driven thereby, a support, having a plurality of openings, an endless carrier having a plurality of bottle receptacles adapted to convey the bottles in an inverted position over said support, means to drive said carrier intermittently to cause a bottle receptacle to stop over said openings during each pause of said carrier, a bottle-rinsing means comprising a plurality of nozzles connected with a fluid-supply pipe, each of said nozzles being arranged to squirt rinsing fluid through an opening and into a bottle in the receptacle thereabove, a valve, means borne by said auxiliary shaft adapted to operate said valve, and means to drive said operating shaft.

7. In a bottle-washing machine, the combination of an operating shaft, means for driving same, an auxiliary shaft driven by said operating shaft, a support having a plurality of openings, an endless carrier having a plurality of bottle receptacles adapted to convey the bottles in an inverted position over said support, means to drive said carrier intermittently to cause a receptacle to stop over said openings during each pause of said carrier, a bottle-rinsing means comprising a plurality of nozzles connected with a fluid-supply pipe, each of said nozzles being arranged to squirt the rinsing fluid through an opening in said support and into a bottle in a receptacle thereabove, a valve, a cam borne by one of said shafts, a member borne by the stem of said valve, and means to hold said member in engagement with said cam.

8. In a bottle-washing machine, the combination of an operating shaft, means for driving same, an auxiliary shaft driven by said operating shaft, a support having a plurality of openings, an endless carrier having a plurality of bottle receptacles adapted to convey the bottles in an inverted position over said support, means to drive said carrier intermittently to cause a receptacle to stop over said openings during each pause of said carrier, a bottle-cleansing means comprising a plurality of revoluble pipes connected with a fluid-supply, each of said pipes being provided with a cleaning device at its discharge end adapted to reciprocate through an opening in said support and to enter and leave a bottle in the receptacle thereabove during each pause of said carrier, means for rotating said pipes, an arm secured to said auxiliary shaft, and a member pivoted to said arm and adapted to reciprocate said rotating means.

9. In a bottle-washing machine, the combination of an operating shaft, means for driving same, an auxiliary shaft driven by said operating shaft, a support having a plurality of openings, an endless carrier having a plurality of bottle receptacles adapted to convey the bottles in an inverted position over said support, means to drive said carrier intermittently to cause a receptacle to stop over said openings during each pause of said carrier, a bottle-cleansing means comprising a plurality of revoluble pipes connected with a fluid-supply, each of said pipes being provided with a cleaning device at its discharge end arranged to reciprocate through an opening in said support and to enter and leave a bottle in the receptacle thereabove during each pause of said carrier, means driven by said operating shaft adapted to rotate said pipes, an arm borne by said auxiliary shaft, a member having one end pivoted to said arm, and means to support the other end of said member, said member being adapted to reciprocate said pipes and the means for driving same simultaneously.

10. In a bottle-washing machine, the combination of a receptacle containing a plurality of gears adapted to rotate simultaneously, each of said gears being provided with a pipe connected with a fluid-supply, each of said pipes being provided with a cleaning device at its discharge end, a shaft, a pinion slidably mounted on said shaft and arranged to mesh with one of said gears, means for driving said shaft, an auxiliary shaft, a roller borne by said receptacle, a member arranged to support said roller, means for supporting one end of said member, and an arm borne by said auxiliary shaft and adapted to raise and lower alternately the other end of said member.

11. In a bottle washing machine, the combination of an endless carrier having a plurality of bottle receptacles adapted to convey the bottles to be cleansed, means for driving the carrier, reciprocatory devices for cleaning the bottles in a receptacle, a support whereon said devices are mounted, means for reciprocating said support, means for loading said receptacles with bottles, a lever connected at one end with said loading means, a member pivoted to the other end of said lever and projecting into the path of movement of said support, and a pin secured to the second-named end of said lever, said support being arranged during its downward movement to press said member against said pin and rock said lever, to operate said loading means.

12. In a bottle washing machine, the combination of an operating shaft, means for driving same, an auxiliary shaft driven from said operating shaft, a bottle cleansing device comprising a support and a plurality of reciprocatory members mounted thereon, each of said members being provided with a brush arranged to enter a bottle, an arm secured to said auxiliary shaft, and a member pivoted to said arm and adapted to reciprocate said support and with it the first-named members.

13. In a bottle washing machine, the combination of an operating shaft, means for driving same, an auxiliary shaft driven from said operating shaft, a bottle cleansing device comprising a support and a plurality of reciprocatory members mounted thereon, each of said members being provided with a brush arranged to enter a bottle, an arm secured to said auxiliary shaft, a member pivoted to said arm and adapted to reciprocate said support and with it the first-named members, and means for rotating said first-named members.

14. In a bottle washing machine, the combination of an operating shaft, means for driving same, an auxiliary shaft driven from said operating shaft, a bottle cleansing device comprising a support and a plurality of revoluble pipes connected with a fluid supply, each of said pipes being provided at its discharge end with a brush arranged to enter a bottle, an arm secured to said auxiliary shaft, a member pivoted to said arm and adapted to reciprocate said support and with it said pipes, and means for rotating said pipes.

In testimony whereof I have hereunto affixed my signature in the presence of two witnesses.

HERMANN KRAUSE.

Witnesses:
  H. SCARBOROUGH,
  GLADYS WALTON.